(12) United States Patent
Myers et al.

(10) Patent No.: US 7,065,186 B1
(45) Date of Patent: Jun. 20, 2006

(54) TELEPHONE BASED ACCESS TO INSTANT MESSAGING

(75) Inventors: John C. Myers, Toronto (CA); Paul M. Brennan, Toronto (CA)

(73) Assignee: Nortel Networks Limited, St. Laurent (CA)

( * ) Notice: Subject to any disclaimer, the term of this patent is extended or adjusted under 35 U.S.C. 154(b) by 294 days.

(21) Appl. No.: 09/707,987

(22) Filed: Nov. 8, 2000

(30) Foreign Application Priority Data

Nov. 8, 1999 (CA) ..................................... 2288573

(51) Int. Cl.
*H04M 11/00* (2006.01)

(52) U.S. Cl. ..................... 379/88.17; 455/466; 709/206

(58) Field of Classification Search ............. 379/88.04, 379/88.17, 202.01, 93.15, 209.01, 201.06; 340/7.2; 709/206, 207, 202; 370/352
See application file for complete search history.

(56) References Cited

U.S. PATENT DOCUMENTS

| | | | | |
|---|---|---|---|---|
| 4,380,009 | A * | 4/1983 | Long et al. ................... 340/7.2 |
| 5,848,134 | A * | 12/1998 | Sekiguchi et al. ........ 379/93.15 |
| 5,884,262 | A | 3/1999 | Wise et al. .................. 704/270 |
| 6,175,619 | B1 * | 1/2001 | DeSimone ............. 379/202.01 |
| 6,212,548 | B1 * | 4/2001 | DeSimone et al. ......... 709/206 |
| 6,389,028 | B1 * | 5/2002 | Bondarenko et al. ....... 370/401 |
| 6,389,127 | B1 * | 5/2002 | Vardi et al. ............ 379/209.01 |
| 6,424,647 | B1 * | 7/2002 | Ng et al. ..................... 370/352 |
| 6,430,604 | B1 * | 8/2002 | Ogle et al. .................. 709/207 |
| 6,449,344 | B1 * | 9/2002 | Goldfinger et al. ...... 379/88.17 |
| 6,449,646 | B1 * | 9/2002 | Sikora et al. ............... 709/226 |
| 6,549,937 | B1 * | 4/2003 | Auerbach et al. ........... 709/206 |
| 2001/0013050 | A1 * | 8/2001 | Shah ......................... 709/202 |

FOREIGN PATENT DOCUMENTS

| | | |
|---|---|---|
| EP | 0 817 457 A2 | 1/1998 |
| WO | 99 01826 A | 1/1999 |

OTHER PUBLICATIONS

European Examination Report from European Patent Application Number 00975701.4, *Telephone Based Access To Instant Messaging*, dated Jun. 23, 2005.

* cited by examiner

*Primary Examiner*—Fan Tsang
*Assistant Examiner*—Gerald Gauthier
(74) *Attorney, Agent, or Firm*—Haynes and Boone, LLP

(57) ABSTRACT

The present invention allows Internet instant messaging to be accessed via a telephone. Instant messaging access from any telephone in the world may be provided via a telephone messaging system. Alternatively, access can be embodied independently as a stand-alone telephone service, for example provided by a telephone company, provided by a company network, or provided by a user's personal IVR service implemented on his PC. An advantage of the present invention is providing simple, cost effective and readily available access to data network instant messaging from a telephone.

19 Claims, 3 Drawing Sheets

TELEPHONE BASED ACCESS TO INSTANT MESSAGING

FIELD OF THE INVENTION

The present invention relates to telephone based access to instant messaging and is particularly concerned with instant messaging in data networks.

BACKGROUND OF THE INVENTION

The Internet in addition to providing e-mail and easy access to information world-wide has provided an increasingly popular form of communication known as "instant messaging". Instant messaging allows the exchange of messages with others currently logged onto the Internet. This is similar to the kind of messaging that used to be available to other types of network users, including mainframe computer users and LAN users, but due to the wide-spread use of the Internet, instant messaging on the Internet has a much broader reach than did previously available forms of instant messaging. Understandably, users are becoming attached to the immediacy and value of Internet instant messaging. Unfortunately instant messaging is only available when the user has an Internet connection.

Multi-media wireless telephones have been developed to increase a user's flexibility in accessing the Internet, however these wireless telephones may not work everywhere and have an associated expense in requiring additional equipment. There have also been increasing numbers of public Internet access terminals. However, as yet these are not universally available and have an associated cost per use.

Hence there is a need to provide an alternative form of access to data network instant messaging and particularly to Internet instant messaging.

SUMMARY OF THE INVENTION

An object of the present invention is to provide an improved method and apparatus for accessing data networking instant messaging.

According to the present invention instant messaging can be accessed via a telephone.

An embodiment of the invention provides instant messaging access from any telephone in the world via a telephone messaging system. Alternatively, the present invention can be embodied independently as a stand-alone telephone service, for example provided by a telephone company, provided by an company network, or provided by a user's personal IVR service implemented on his PC.

According to an aspect of the present invention there is provided a voice (telephone) based client providing access into instant messaging.

An advantage of the present invention is providing access to data network instant messaging from a telephone.

BRIEF DESCRIPTION OF THE DRAWINGS

The present invention will be further understood from the following detailed description, with reference to the drawings in which.

DETAILED DESCRIPTION

Figure 1:
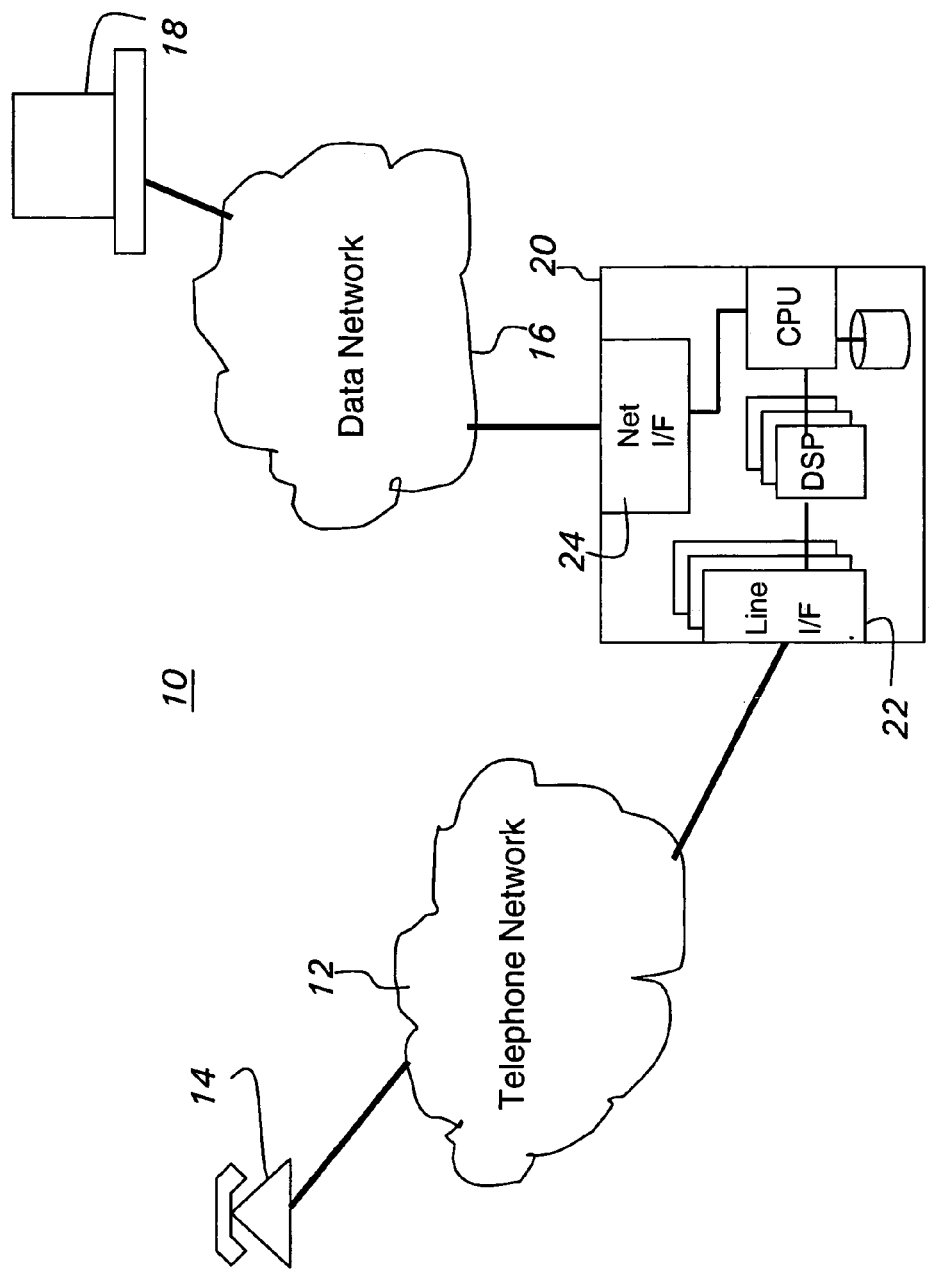
FIG. 1 illustrates a communications system incorporating an embodiment of the present invention.

Referring to FIG. 1, there is illustrated a communications system incorporating an embodiment of the present invention. The communications system 10 includes a telephone network 12 including telephone user 14 and a data network 16, that may include the Internet, including a user PC 18 connected thereto. A messaging system 20 includes an interface 22 to the telephone network 12 and a network interface card 24 coupled to the data network 16. The telephone user 14 accesses the messaging system 20 via the telephone network 12. The messaging system includes typical functions such as speech recognition, interactive voice response (IVR), voice messaging and, in accordance with an embodiment of the present invention, voice access to instant messaging.

Figure 2:
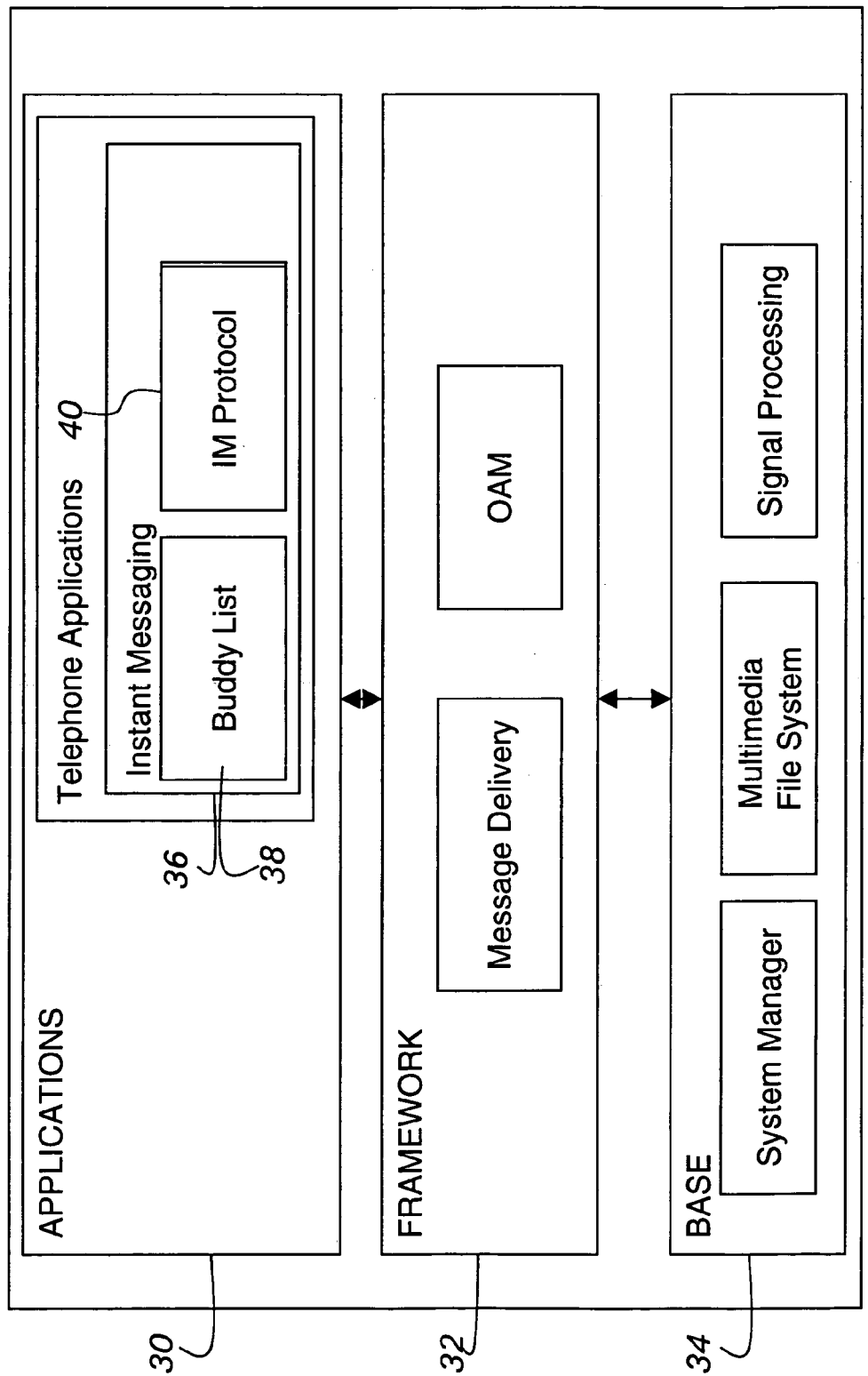
FIG. 2 illustrates the voice messaging system capable of providing voice access to Internet instant messaging of FIG. 1.

Referring to FIG. 2 there is illustrated the voice messaging system (VMS) capable of providing the voice access to Internet instant messaging of FIG. 1. The voice messaging system 20 is a collection of software components capable of using a desired hardware platform to produce desired applications for end users. The hardware platform is also used as the vehicle to interface with the external world via the public telephone network 12 and the data network and Internet 16.

At the higher level, the voice messaging system is divided into two logical entities: an applications layer 30 and a framework layer 32. The applications layer is responsible for providing end user applications. The applications layer addresses issues related to user interaction such as dealing with voice messages, multimedia messages, recognizing DTMF and voice commands.

The framework layer 32 is a collection of software components that integrate with base software components 34 to provide the needed functionality for building, supporting and operating applications.

The lowest level is the base. The base software components typically act as an intermediary between the higher level software components and a hardware platform, and are similar in function to the operating system in a general purpose computer. The base software hides from the higher level software components the hardware-dependent detail of the target platform. The base provides all the needed call processing functionality (e.g. telephony and signal processing) and computing functionality (e.g. operating system and networking software) to build and support its portfolio of applications.

The present embodiment of voice messaging system includes in telephone applications an instant messaging function 36 having a buddy list 38 and instant messaging protocol 40 similar to those used on PC-based instant messaging applications.

In operation, the voice messaging system instant messaging function accesses buddy list 38 and protocol 40. When a user logs into their voice messaging account via the phone, they can also request a list of their buddies who are logged in, or if desired, optionally the voice messaging system could provide the buddy list automatically at each login. The VMS 20 announces the names of the logged in members of the buddy list, using text-to-speech or pre-recorded names for each buddy. The user then indicates, for example via a command accepted by the speech recognition function or via a DTMF command, that they wish to send an instant message to one of the logged in buddies. They then receive a record tone and record a voice segment (delineated by either the '#' key or silence). This prompt would then be sent to the logged on buddy as a sound file (probably .wav) or as a text translation of the spoken voice (assuming the target buddy was on a PC). Alternatively, a user may select from a list of predetermined messages, either voice or text.

The target buddy could respond with either a text message (that would be read via TTS to the phone caller) or a sound clip in return. The instant messaging function 36 could optionally allow users to identify themselves at a particular telephone (fixed or wireless) for a period of time, and receive (and respond to) incoming instant messages, via techniques used today for remote notification of voice messages. That is, the VMS 20 makes a call to a user upon receipt of an instant message, and after appropriate identity verification, plays an instant message, and allows the user to create and send a reply. The instant messaging function could also make use of accessible displays in telephones, either for presenting buddy lists, or in presenting incoming instant messages.

If the reply arrives during the time the telephone user is logged onto the voice messaging system 20, the instant messaging function 36 notifies the telephone user of the reply to the instant message. The VMS 20 gives the telephone user the option of hearing the message using text to speech, playing the message if it is a sound clip or viewing the message if the telephone user's telephone has a suitable display.

Figure 3:
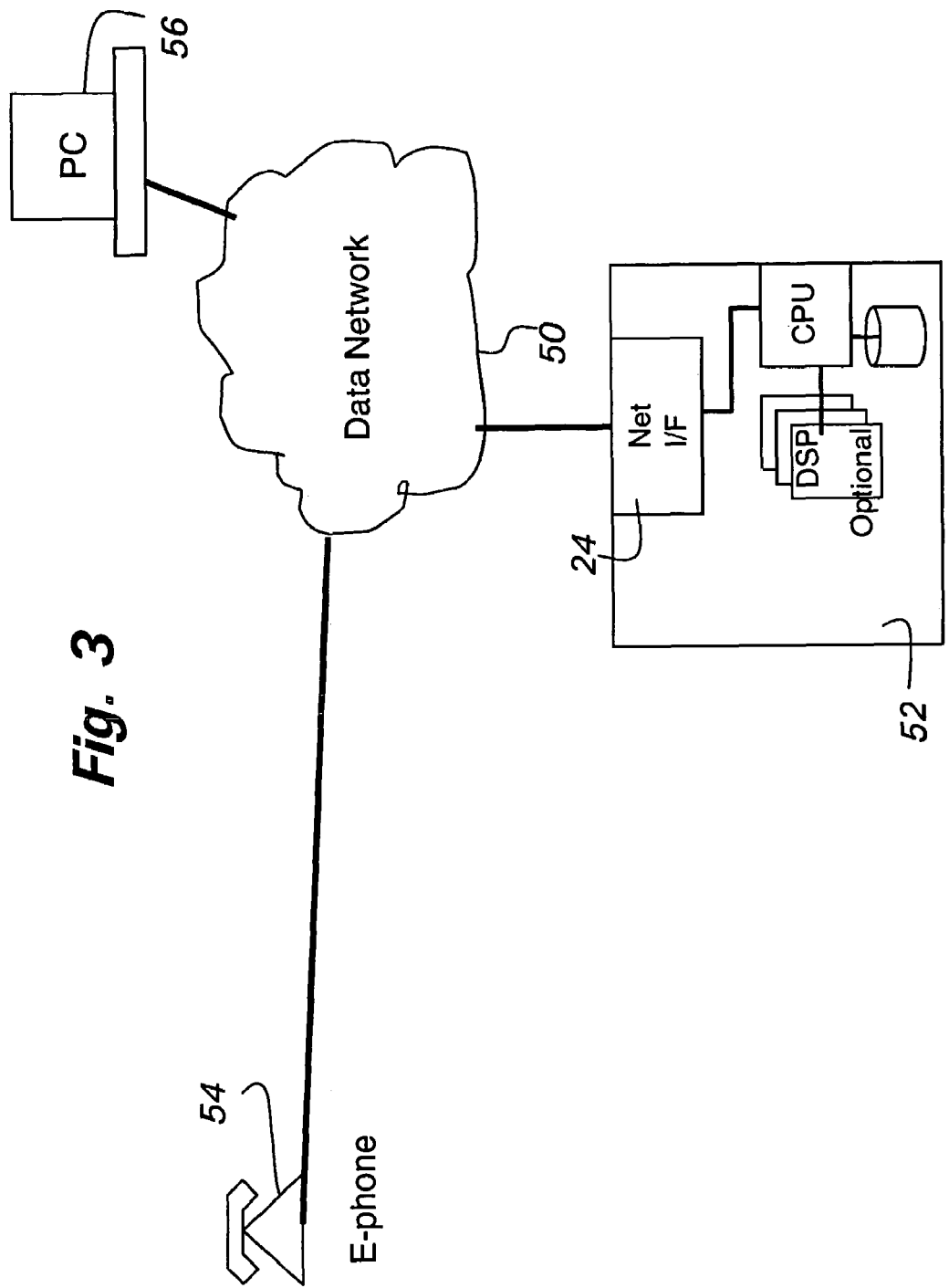
FIG. 3 illustrates a data communications network including a second embodiment of the present invention.

Referring to FIG. 3, there is illustrated a data communications network including a second embodiment of the present invention. The data network 50 includes a network server 52 providing a gateway between voice over IP services and the IP data network 50. In this embodiment, both the telephone user 54 and the computer user 56 are connected via a data network such as the Internet. The functions provided by the server are similar to those described herein above for the voice messaging system.

The present embodiments have been described as they could be implemented as a feature of a telephone messaging system such as Nortel Networks Corporations CallPilot (trademark of Nortel Networks Corporation) and as a server connected to a data network. Alternatively, the present invention could be embodied independently as a stand-alone telephone service, provided by a telephone operating company, provided by a company intranet or private network, or provided by a user's personal IVR service implemented on his PC.

Numerous modifications, variations and adaptations may be made to the particular embodiments of the invention described above without departing from the scope of the invention that is defined in the claims.

We claim:

1. A method of accessing instant messaging on a data network at a telephone comprising the steps of:
   identifying a subscriber, a telephone number at which they can receive messages, and a period of time for which they can receive messages at this number;
   establishing the user's presence and ability to receive instant messages on the data network during the specified time period;
   determining if the subscriber is a personal communications subscriber and if so, maintaining a presence on the data network for forwarding instance messages to the subscriber, and if not, presenting to the subscriber a subset of a predetermined user list, the subset representing users logged onto the data network; and
   where an instant message is sent to the subscriber during the period of availability, calling the subscriber at the predetermined telephone number and delivering the message and an identity of a sender of the message by voice synthesis.

2. A method of accessing instant messaging on a data network at a telephone comprising the step of:
   identifying a telephone user as a subscriber, a telephone number at which they can received messages, and a period of time for which they can receive messages at this number;
   establishing the subscriber's presence and ability to receive instant messages on the data network during the specified time period;
   determining if the telephone user is a personal communications subscriber, and if so, maintaining a presence in the data network for the telephone user for receiving and forwarding instant messages to the telephone user, and if not, presenting to the subscriber a subset of a predetermined user list, the subset representing users logged onto a data network;
   responsive to the subscriber selecting a particular user from the subset of the predetermined user list, sending a message from the subscriber to the selected data network user using an instant messaging protocol.

3. A method as claimed in claim 2 wherein the step of presenting occurs upon receipt of a predetermined command from the subscriber.

4. A method as claimed in claim 3 wherein the step of presenting includes voice synthesizing names on the user list.

5. A method as claimed in claim 3 wherein the step of presenting includes playing back prerecorded names on the user list.

6. A method as claimed in claim 3 wherein the step of presenting includes displaying names on the user list on a display associated with the telephone.

7. A method as claimed in claim 2 wherein the step of presenting occurs automatically upon login by the subscriber.

8. A method as claimed in claim 7 wherein the step of presenting includes voice synthesizing names on the user list.

9. A method as claimed in claim 7 wherein the step of presenting includes displaying names on the user list on a display associated with the telephone.

10. A method as claimed in claim 7 wherein the step of presenting includes playing back prerecorded names on the user list.

11. A method as claimed in claim 2 wherein the step of selecting includes the step of receiving a DTMF command from the subscriber.

12. A method as claimed in claim 2 wherein the step of selecting includes the step of receiving a voice command from the telephone user.

13. A method as claimed in claim 2 wherein the step of selecting includes the step of receiving a proprietary signal from the telephone.

14. A method as claimed in claim 2 wherein the step of sending a-message includes recording and sending a voice message.

15. A method as claimed in claim 2 wherein the step of sending a message includes sending a prerecorded voice message.

16. A method as claimed in claim 2 wherein the step of sending a message includes sending a prerecorded text message.

17. A method as claimed in claim 2 wherein the step of sending a message includes sending a text transcription of a voice message.

18. A method as claimed in claim 2 further comprising the steps of receiving an instant message in response the message sent by the telephone user and notifying the telephone user of the receipt of the message.

19. A method as claimed in claim 18 further comprising the steps of, during the duration of time, receiving an instant message in response the message sent by the telephone user and notifying the telephone user of the receipt of the message at the telephone user's telephone number.

* * * * *

UNITED STATES PATENT AND TRADEMARK OFFICE
CERTIFICATE OF CORRECTION

PATENT NO. : 7,065,186 B1 Page 1 of 1
APPLICATION NO. : 09/707987
DATED : January 20, 2006
INVENTOR(S) : Myers et al.

It is certified that error appears in the above-identified patent and that said Letters Patent is hereby corrected as shown below:

Please add the following claim:

20. A method of accessing instant messaging on a data network at a telephone comprising:

identifying a telephone user as a subscriber, a telephone number at which they can received messages, and a period of time for which they can receive messages at this number.

establishing the subscriber's presence and ability to receive instant messages, on the data network during the specified time period;

presenting to the subscriber a subset of a predetermined user list, the subset representing users logged onto a data network, wherein the presenting includes:

determining whether the telephone user is logged onto the data network by determining if the telephone subscriber is a personal communications subscriber and if the user is, maintaining a presence in the data network for the telephone user for receiving and forwarding instant messages to the telephone user and, if the telephone user is not logged onto the data network, then presenting the user list; and responsive to the subscriber selecting a particular user from the subset of the predetermined user list, sending a message from the subscriber to the selected data network user using an instant messaging protocol.

Signed and Sealed this

Twenty-sixth Day of December, 2006

JON W. DUDAS
*Director of the United States Patent and Trademark Office*